R. G. JENNINGS.
YARN CLEANER.
APPLICATION FILED JAN. 20, 1920.
Reissued Mar. 16, 1920.
14,818.
6 SHEETS—SHEET 1.
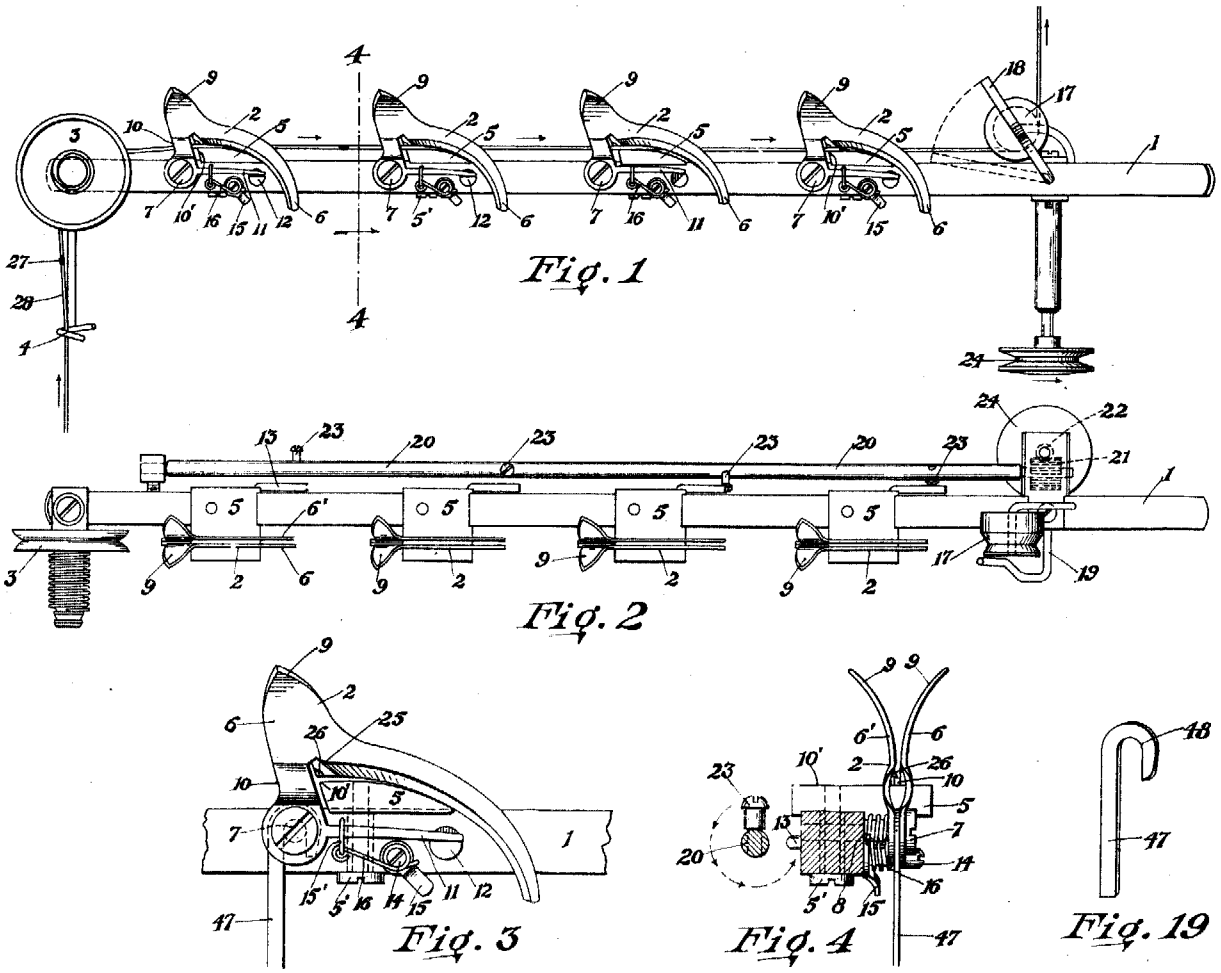
INVENTOR
R. G. Jennings
BY
Dull, Warfield & Dull
ATTORNEY R. G. JENNINGS.
YARN CLEANER.
APPLICATION FILED JAN. 20, 1920.
Reissued Mar. 16, 1920.
14,818.
6 SHEETS—SHEET 2.
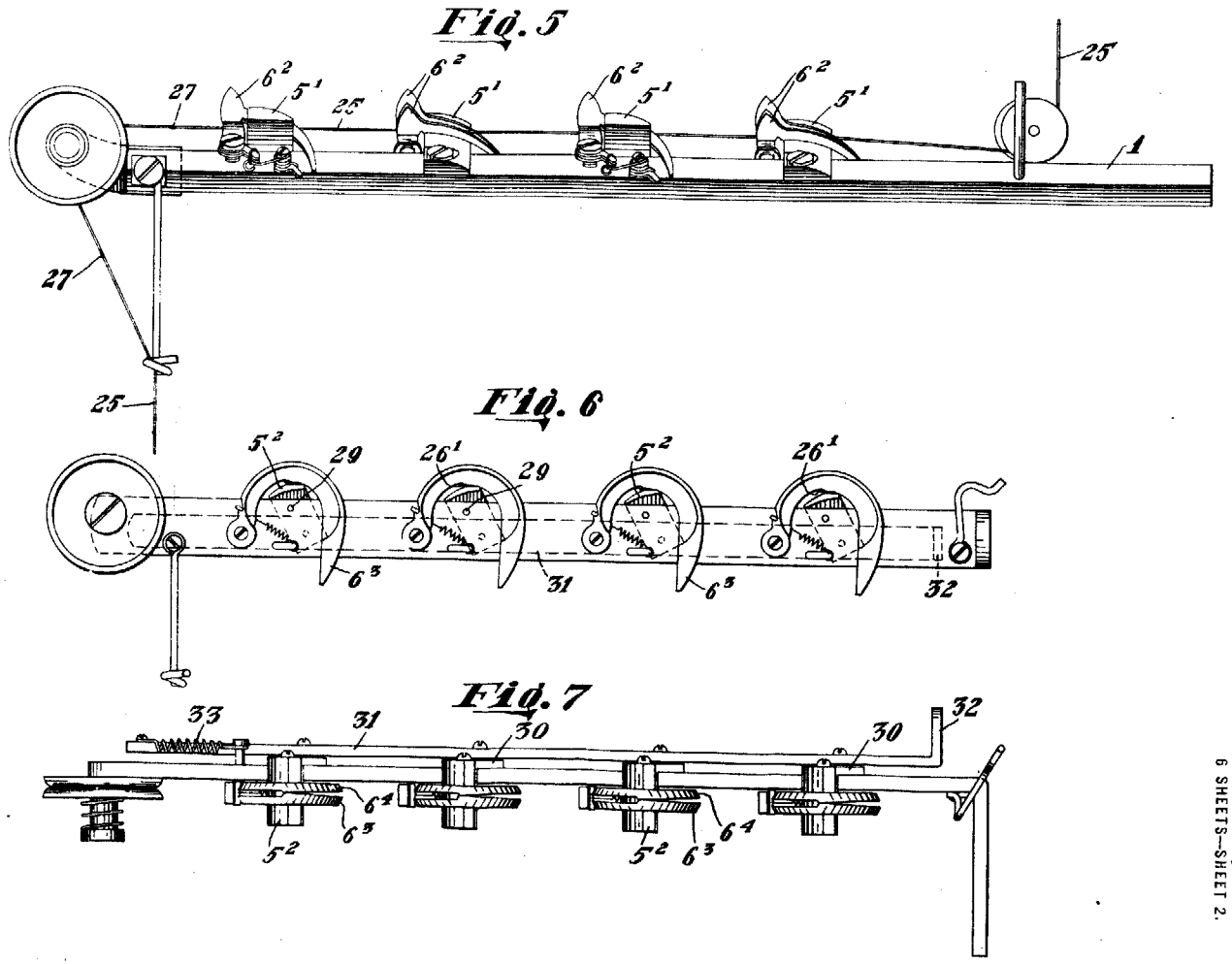
INVENTOR
R. G. Jennings
BY
Bull, Campbell & Bull
ATTORNEY

R. G. JENNINGS.

YARN CLEANER.

APPLICATION FILED JAN. 20, 1920.

Reissued Mar. 16, 1920.

14,818.

6 SHEETS—SHEET 3.

INVENTOR

R. G. Jennings

BY

Dull, Crofield & Dull

ATTORNEY

R. G. JENNINGS.

YARN CLEANER.

APPLICATION FILED JAN. 20, 1920.

Reissued Mar. 16, 1920.

14,818.

6 SHEETS—SHEET 4.

INVENTOR

R. G. Jennings

BY

Duell, Mayfield & Duell

ATTORNEY

R. G. JENNINGS.

YARN CLEANER.

APPLICATION FILED JAN. 20, 1920.

Reissued Mar. 16, 1920.

14,818.

6 SHEETS—SHEET 5.

INVENTOR

R. G. Jennings

BY

Brill, Warfield & Brill

ATTORNEY

R. G. JENNINGS.
YARN CLEANER.
APPLICATION FILED JAN. 20, 1920.
Reissued Mar. 16, 1920.
14,818.
6 SHEETS—SHEET 6.
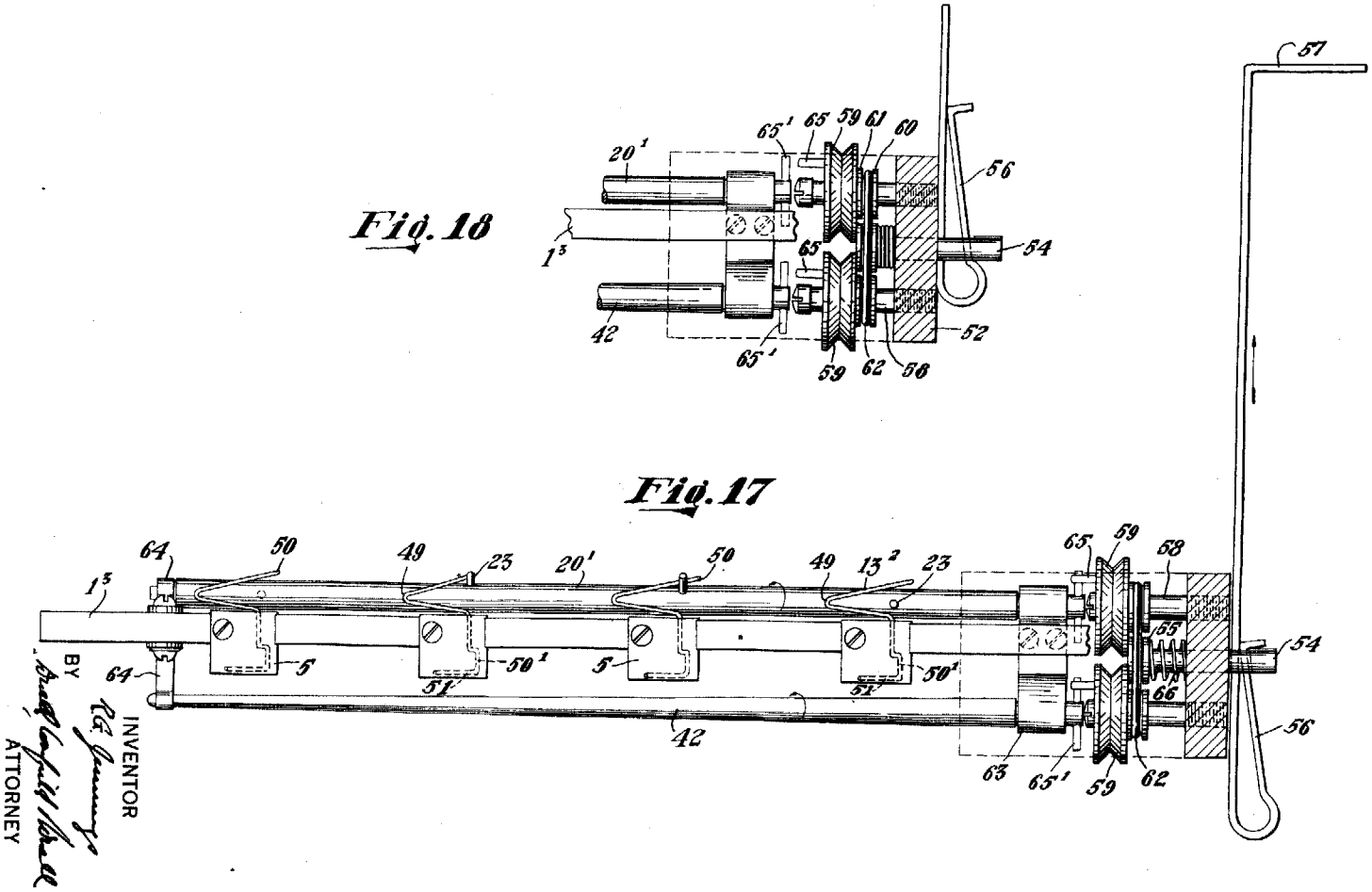
INVENTOR
R. G. Jennings
BY
Brett, Canfield & Brett
ATTORNEY

UNITED STATES PATENT OFFICE.

ROBERT G. JENNINGS, OF ELMIRA, NEW YORK.

YARN-CLEANER.

14,818. Specification of Reissued Letters Patent. Reissued Mar. 16, 1920.

Original No. 1,301,133, dated April 22, 1919, Serial No. 650,743, filed September 22, 1911. Application for reissue filed January 20, 1920. Serial No. 352,905.

*To all whom it may concern:*

Be it known that I, ROBERT G. JENNINGS, a citizen of the United States, and a resident of Elmira, in the county of Chemung and State of New York, have invented certain new and useful Improvements in Yarn-Cleaners, of which the following is a specification.

My invention relates to devices for removing impurities such as broken seeds, fragments of leaves and stalks, dirt, burs, lumps of fiber and the like, such as are found in cotton and other yarns after passing through the usual manufacturing operations, and embodies modifications of devices for similar purposes previously described and patented to me in the United States, May 9, 1911, No. 991,510.

The object of my present invention, as of the invention of my earlier patent just referred to, is, broadly speaking, to provide effective means for separating such impurities from the yarn preparatory to the weaving and knitting operations.

A particular object of my present invention is to provide devices of the same general character and operating on the same general principle as the invention of my earlier patent, but with less tension upon the yarn, and of simplified and more compact form. A further object of my present invention is to provide an automatic adjustment in devices of the character specified by means of which yarn of any diameter may be operated upon without change of parts or manual adjustment requiring attention and involving loss of time. A further object of my invention is to provide means for instantly arresting all moving parts of the yarn cleaner upon breakage of the yarn. Another object is to provide a mechanism for the purposes mentioned which comprises structurally improved parts combined and operating in a functionally advantageous manner. A still further object of the present invention is to provide devices of the character specified, such that the yarn may be more readily applied to said devices in the first instance, or in case the yarn should break during the cleaning operation; other incidental objects will appear as the specification proceeds.

The invention also comprises improved means for removing and massing together, in a substantially continuous manner, the impurities as they are removed and collected from the yarn.

In my prior Patent, No. 991,510, above referred to, I have described and claimed a yarn cleaning device comprising a bed or bracket over which the yarn is drawn parallel to and immediately beneath a pair of V'd gripping edges, means being provided for twisting the yarn, if necessary, as it approaches said edges, so as to cause any attached impurities, specks of dirt, etc., to enter the V formed by and between said edges and to be caught and held there while the yarn is then drawn aside from its direction of travel over the bed, so as to detach it from said impurities, which are left behind between the gripping edges. Each pair of gripping edges with the immediately associated parts as the bed, means for twisting the yarn, etc., may be termed a "cleaning unit." Since, in operation, the yarn is caused to travel a high rate of speed and since an occasional speck or other impurity may slip through the cleaning unit without being detached, I prefer to employ several cleaning units placed so that the yarn to be cleaned will pass through them successively, (four are shown in the specification referred to). But since to detach a speck, the yarn must be turned in direction so as to be led away from the gripping edges, while to pass through the next cleaning unit the yarn must be brought back toward its previous line of travel and be again led over the bed adjacent to the gripping edges of said next unit, the tension upon the yarn in drawing it through the apparatus is very materially increased over and above that which would exist were the yarn drawn through the apparatus in an unvarying straight line and, correspondingly, the liability to breakage is also increased. Furthermore, in positioning the yarn, in the first instance, in the apparatus preparatory to cleaning it, as also after a break has taken place, a very considerable time, as well as degree of operative skill, is required to wind the yarn back and forth through the various cleaning units and over the various intermediate pulleys or other means which may be employed for changing the direction of travel of the yarn.

My improved apparatus, as set forth in the present specification, avoids these objections as well as presents certain other advantages.

Essentially my present invention consists in replacing the bracket or bed 3 of my earlier patent by a bed curved forwardly and away from the line of travel of the yarn and by causing the gripping blades 4 and 5 of said patent to be turned into planes normal to the surface of said bed instead of parallel thereto, the blades being placed back to back, with their edges forming V's with the curved bed, and with each edge conforming generally to the curvature of the bed. In this way the bed itself becomes a common gripping edge or blade with relation to each of the two remaining blades proper. Considered from another point of view each blade proper becomes a bed with relation to the remaining blade and the curved bed taken as a pair of gripping edges. The curved bed and the blades lead the removed impurities away from the initial line of travel of the yarn and said yarn may, therefore, be drawn through each and every cleaning unit along one and the same straight line, thereby eliminating the tension due to the frequent change of direction in the apparatus of my earlier patent. As will be seen later, this construction also greatly facilitates placing the yarn in position in the apparatus, either initially or after a break has taken place.

In the accompanying drawings, which are hereby made a part of this specification,—

Figure 1 represents a side elevation and Fig. 2 a plan view, of a preferred form of my invention;

Fig. 3 is a side elevation, considerably enlarged, of one of the cleaning units shown in Figs. 1 and 2:

Fig. 4 is a transverse section, similarly enlarged, taken along the line 4—4 of Fig. 1;

Fig. 5 is a side elevation of a modified form of my invention very similar to the form shown in the preceding figures, save that the cleaning units are alternately set in two planes differing by 90°;

Fig. 6 is a side elevation and Fig. 7 a plan view of another modification of my invention;

Figure 12:
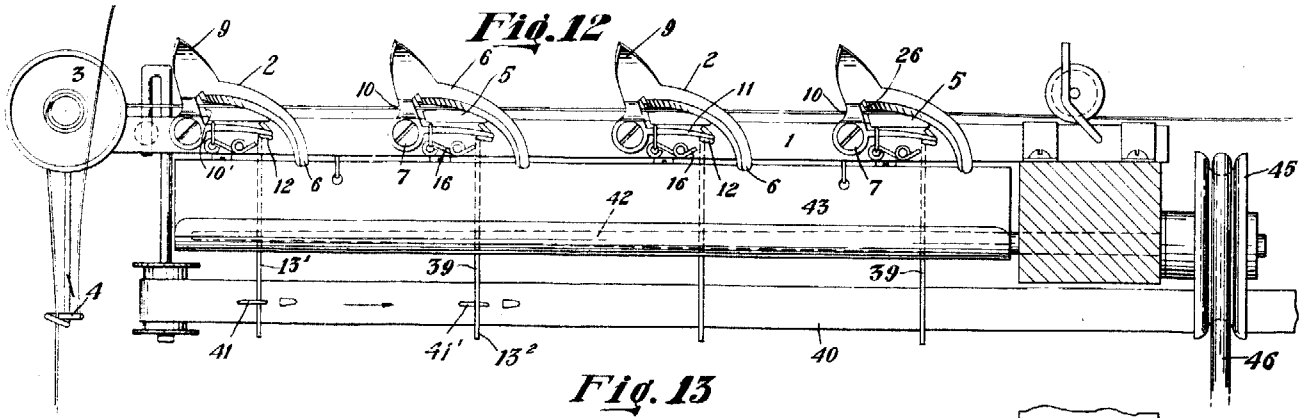
Fig. 12 is a side elevation and Fig. 13, a plan of a form of my invention embodying the same type of cleaning unit proper as is shown in Figs. 1 to 4 but employing somewhat different means for raising the blades, as will be later described, and also showing improved means for massing and collecting together the impurities removed from the yarn by the several cleaning units.
Figure 13:
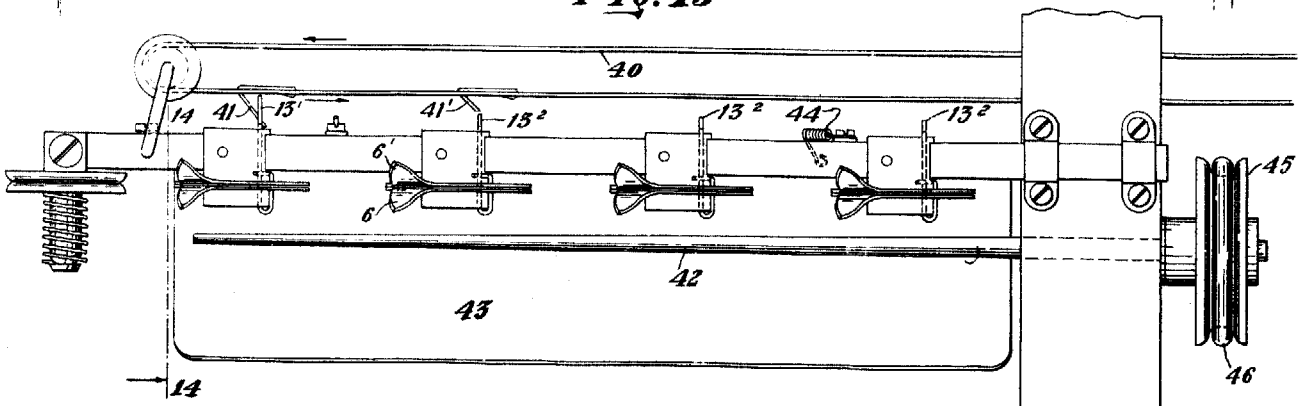
Figure 14:
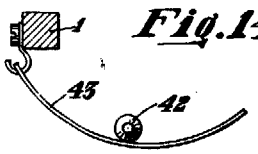
Fig. 14 is a section taken along the line 14—14 of Fig. 13.
Figure 15:
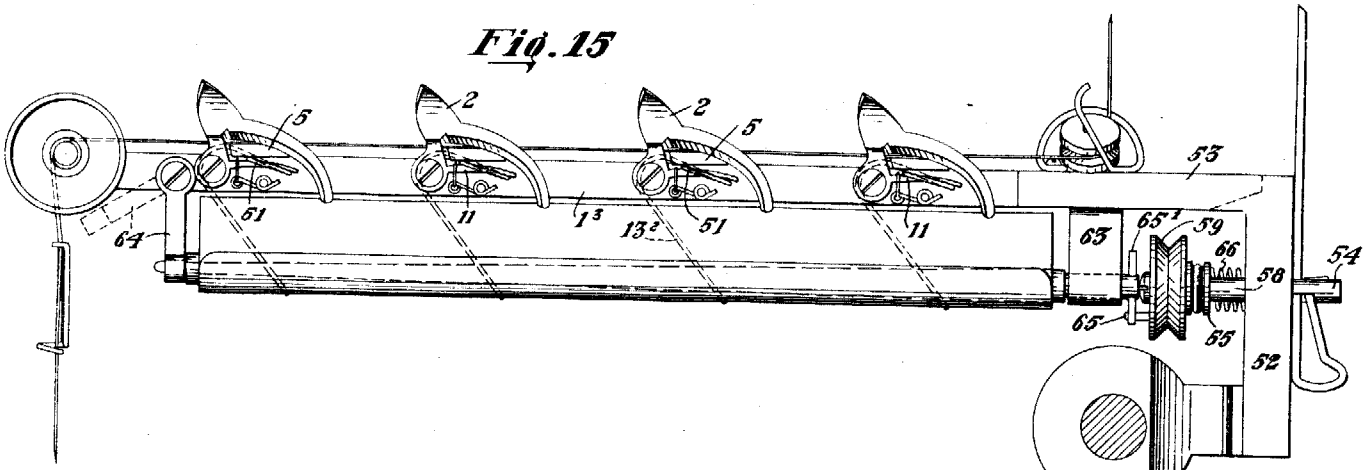
Figure 16:
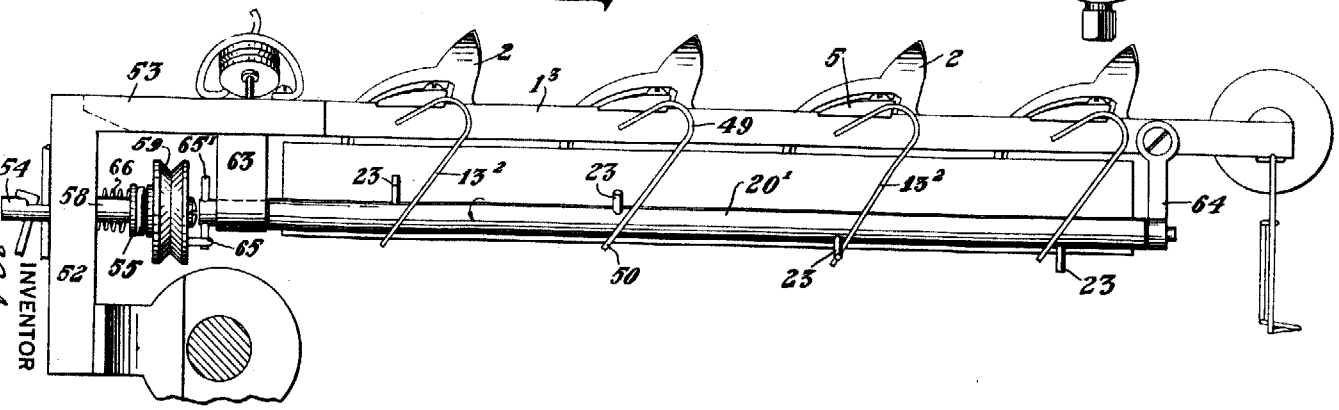

Fig. 15 is an elevation taken from one side and Fig. 16 an elevation taken from the other side showing a form of my invention very similar to that shown in Figs. 12 to 14 but embodying means for instantly and automatically stopping the blade raising means and the impurity collecting or gathering spindle in case the yarn should break, and embodying also another modification of my blade raising means;

Fig. 17 is a plan view, part being broken away and part in section, of the form of my invention shown in Figs. 15 and 16 with parts omitted;

Fig. 18 is a view, similar to that of Fig. 17, but with the above mentioned "stopping" means shown in the position it occupies when there is no yarn being cleaned or when the yarn has broken; and Fig. 19 is a view in perspective of a distance piece (shown in position in Figs. 3 and 4) for separating the blades of a cleaning unit when large yarns are to be cleaned.

Referring to the form shown in Figs. 1 to 4, a rectangular supporting bar 1 carries for cleaning units 2, 2, spaced along its length and is provided on its rear end, to the left of said units, with a tension device 3 of conventional form beneath which is supported an open circular wire loop or eye 4.

Each cleaning unit comprises a bracket or bed 5, fixed to the bar 1, having an upper surface which is flat for a short distance and is then curved forwardly and downwardly in sickle shaped outline; and a pair of gripping blades 6, 6′ pivoted upon one side of the bar, upon a spindle 7, at the left and beneath the bracket, transverse to the bar. Each of these blades is also sickle shaped and has its inner edge beveled on its outer side and in contact with the bed 5 at the forward end thereof while diverging gradually therefrom toward the pivoted end of the blade so as to leave a curved V slot between said blade and said bed. The ends of the blades are prolonged in their downward curve and terminate well below the bed 5. The pair of blades is kept pressed together, back to back, by a coiled spring 8 mounted upon the axis 7, and each blade is provided with ears 9, flaring away from one another, and outwardly expanded portions below said ears constituting a clearance 10 whose axis is substantially coincident with the adjacent upper edge 10′ of bed 5.

The bottom of bed 5 is slotted longitudinally so as to fit down over bar 1 and the screw 5′ which holds said bed to said bar passes through a hole in the bar which is somewhat larger than the shank of the screw (see Figs. 3 and 4) so that the bed has a certain sliding adjustment lengthwise of the bar thus permitting a corresponding variation in the exact character of the curved V slot.

Beneath the bed and projecting from each blade 6 to the right of the pivot is an arm 11, the outer end of which lies normally a little above and spaced from the end of a cylindrical pin 12, rotatably fixed in the bar 1; the end of this pin is cut away on its upper side down to its central plane and it is upon the plat surface thus established that the arm 11 rests. The other end of pin 12 is bent, parallel with and adjacent to the side of bar 1 remote from the blades 6, to constitute a trip-arm 13.

Fixed to the bar 1 below the arm 11, is an adjustable screw 14 adapted to clamp a rotatable adjustable lug 15, to which is attached a coiled tension spring 16 linked to a ring or yoke 15′ which embraces both arms 11 of the particular cleansing unit whereby a constant downward pressure is exerted thereupon to keep the blade edges against the bed. Each blade of a given cleaning unit is, hence, adapted to yield independently of its companion blade so as to positively grasp and hold the impurities which may be drawn under its edge.

Supported upon the right of bar 1 with its bottom groove in line with the flattened portion of the top of the beds 5 is a grooved pulley 17. A guard wire 18 is rotatably attached to the bar by a straight portion 19 and may be swung up at the side of the pulley or down away from the pulley (dotted lines Fig. 1) as may be preferred.

Upon the side of bar 1, opposite the blades 6, and extending longitudinally of said bar is supported a tripping shaft 20 having at one end a gear 21, meshing with a worm 22. Projecting normally from this shaft and corresponding to each cleaning unit is a pin 23, each pin being set in a plane 90° in advance of that of the preceding pin. The worm 22 is fixed upon a spindle carrying a pulley 24, adapted to be rotated by a light belt (not shown) taken from any convenient source.

The edge of the outer blade 6 (the blade remote from the bar 1) as it diverges from the bed 5 is shorter on its rear end than the corresponding edge of its inner companion blade, being cut away at 25. The corner 26 of the inner blade corresponding to this cut away portion of the outer blade 6′ is bent slightly toward the plane of said outer blade, (see Figs. 3 and 4), and constitutes a deflector to turn the speck 27, which is to be removed, into a favorable position to be caught by the gripping edges. This particular arrangement is preferred when "right hand" twist yarn is being cleaned. In the case of "left hand" twist yarn the reverse arrangement should preferably be employed, *i. e.*, the outer blade should be the longer and be provided with the deflector while the inner blade should be cut away.

The operation of my invention as just described is as follows: The yarn 28 is passed up through the eye 4 and through and between the disks of the tension device 3, and is then laid along and between the ears 9 of the gripping blades and in the groove under the pulley 17, being thence run off in an upward direction to the winding machine. This will cause the yarn to lie lightly along the upper flat surfaces of the beds 5, being pressed between the blades 6, 6′ and passing axially through the guides 10.

As the yarn is driven through the apparatus at a very rapid rate of speed, each speck 27 as it contacts with the edge 10′ of the bed will be turned by said edge to project above the bed to be either instantly met by the corner or deflector 26 which will turn the speck either to the left or right, so as to slip into one or the other of the two V slots formed between the two blade edges and the bed, or else to slip naturally into one of said slots without being met by said deflector.

As the yarn passes through the several cleaning units and over the pulley 17 it will lie in one and the same straight line and will contact with the edge 10′ of each bed 5. The yarn will be lightly held between and against the inner sides of the two blades 6, 6′ of each cleaning unit through the pressure of spring 8, and these blades will yield to and conform with any variation of diameter of the yarn as it is drawn along. Hence, the blades will adjust themselves automatically to receive and operate with yarn of any diameter which may require to be cleaned.

After the specks have entered and been gripped in the V slot between one or the other blades and its bed, they are drawn forward by the yarn into the narrower region of the slot where they are left by the yarn as the latter is eventually pulled away from them. Each successive particle will push the preceding speck a little farther along and into the downward curve of the slot, and the tendency of these removed particles is, therefore, to mass or bunch together and eventually to cause the earlier removed particles to pass completely along and through the slot and out over the forward end of the bed 5. Since to thus push the mass of removed particles through the slot puts an extra strain upon the yarn and since, further, the mass of particles tends to raise the blades and unduly widen the slots, it is desirable to assist, if possible, the movement of the massed particles and to free them from the cleaning unit before they become too numerous.

I accomplish this through the rotation of the shaft 20 from the pulley 24; as the shaft revolves the pins 23 successively contact with and raise the trip-arms 13 through a small angle, thus correspondingly turning the pins 12 and raising the blades 6, 6′ by means of the flat of the pins 12 and the arms 11. The springs 16 will restore the blades to their original contact position with the beds so soon as the pins 23 have passed the trip-arms 13. This intermittent action, as described, is of special advantage in that the blades are moved toward the running thread and the massed particles are pushed by the latter and thus their ejection from the gripping means expedited and insured. As each pair of blades is thus raised for the instant the pressure upon the massed particles is released and the entire mass moves forward toward the forward end of the bed.

The purpose of using more than one cleaning unit is to insure that the yarn shall be thoroughly cleaned; any particle which may happen to be held by the yarn especially tightly and hence may be only partially detached by the first cleaning unit or which for any reason may slip by the first cleaning unit altogether has still to pass through the remaining units and is certain to be removed before the yarn emerges from the last of said units.

The modification shown in Fig. 5 is very similar to that of Figs. 1 to 4 just described, except that the component parts of each cleaning unit are successively and alternately mounted upon adjacent sides of the square bar 1. The blades $6^2$ and beds 5′ of the several cleaning units are so set that when the yarn lies in position between the blades and upon the brackets, said thread will be perfectly straight. In this form of my device the cleaning units have been turned at right angles to one another to avoid the use of the inwardly projecting tongue or deflector 26 of the form above described. A speck which slips through the first cleaning unit because parallel to its planes is obviously in the best position to be gripped by the blades of the next cleaning unit.

The modification shown in Figs. 6 and 7, more nearly resembles that of Figs. 1 to 4 than it does the form shown in Fig. 5. Save for the fact that the exact curvature of the sickle-shaped gripping edges of the blades $6^3$, $6^4$ as well as the contour of the upper surface of the bed $5^2$ differs somewhat, the only essential difference is the supporting of the bed upon a pivot 29 and the use of a link 30 attached to each bed and connected with a slidable side bar 31 having a lug 32, adapted to be contacted and pressed upon by some suitable operative element. The bar is restored to its initial position by a quick return spring 33. This arrangement permits the beds $5^2$ to be shifted under the blades in periodic fashion and assists in freeing the slots between beds and blade edges from the massed particles collected from the yarn. The one blade $6^4$ has its corner 26′ turned under the other blade to constitute a deflector as in the structure shown in Figs. 1 to 4.

Figure 8:
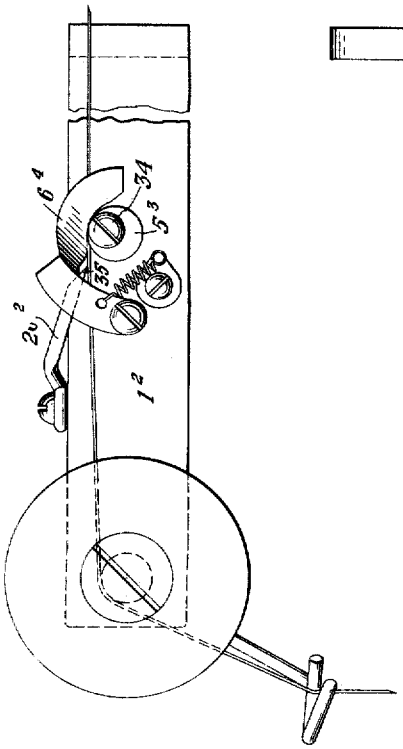
Fig. 8 is an enlarged side elevation and Fig. 9 a plan, also enlarged, showing another modification of my invention part being broken away so that but one cleaning unit is shown.
Figure 9:
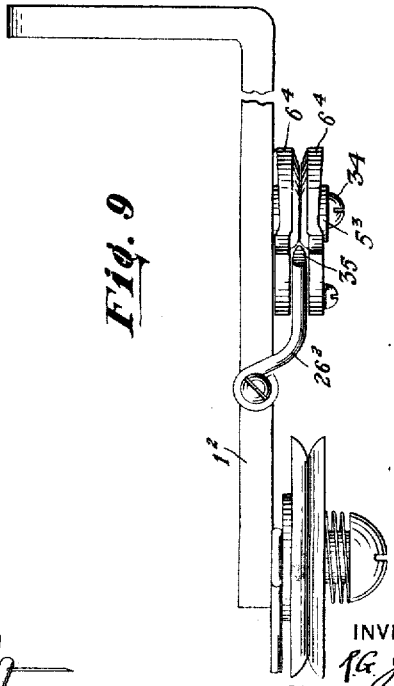

Figs. 8 and 9 show a single cleaning unit, of the general type previously shown and described, in which the bed $5^3$ is a section of a cylinder and is pivoted eccentrically but held stiffly against the bar $1^2$ by a slotted pivot post 34, thus permitting of an angular adjustment by means of which the shape, size, position, etc., of the slot formed between the bed and the blades may be altered. In this modification the blades are not provided with the deflecting tongue 26 of the preferred form (Figs. 1 to 4) but have instead, a wire $26^2$ attached at one end to the bar $1^2$ and inclined downwardly and forwardly to terminate just above the running yarn in an edge 35, beveled upon its upper side, which constitutes a turning edge and operates to deflect or turns any speck which may contact with it to the one side or the other so as to be caught in the slot formed between the bed and one or the other of the blades $6^4$.

Figure 10:
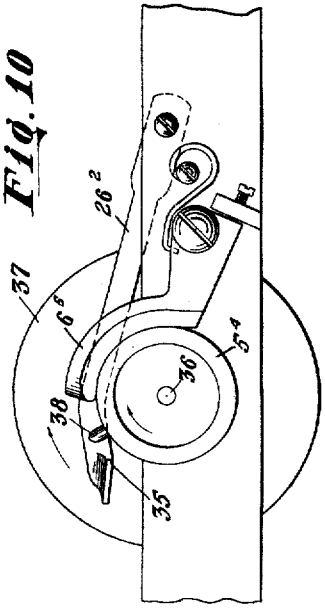
Fig. 10 is a side elevation and Fig. 11 a plan, both similarly enlarged, of still another modification of my invention part being broken away as in Figs. 8 and 9.
Figure 11:
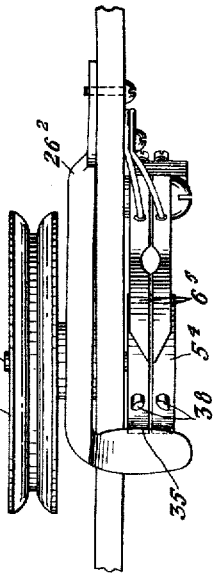

The modification shown in Figs. 10 and 11 is generally similar to that of Figs. 8 and 9 but the bed $5^4$ is centrally mounted upon a spindle 36 which carries a pulley 37 so that the bed may be slowly but continuously rotated. At each rotation pins 38 projecting from the periphery of the bed will raise the blades $6^5$ and sweep the massed impurities which may have been collected and retained in the V slots out of and away from said slots.

Figs. 12 and 13 show, in elevation and plan respectively, a set of four cleaning units as shown in Figs. 1 to 4 but having a somewhat different arrangement for removing the massed impurities from the units after said impurities have been removed from the yarn. Here, a single light wire 39 has one end bent back upon itself to form a flat loop (equivalent to the flat surface of pin 12 Figs. 1 to 4) while its other end, after passing through the bar 1, hangs freely downward and constitutes a trip arm 13′. A belt 40, supported below the bar 1 adjacent to the trip arms and driven in any convenient way, is provided with forwardly projecting hooks 41 arranged to engage the trip arms and carry them forward through a certain angle before releasing them thus raising the blades 6, 6′ and permitting the massed impurities to move forward.

The first one or two cleaning units to be traversed by the yarn will generally remove and collect impurities much more quickly than the succeeding units since these latter can only operate upon the few impurities which, for one reason or another, may slip by the earlier units. It may, hence, be desirable to clean the units which are earliest traversed by the yarn more often than the other units and this I accomplish by having some of the trip arms $13^2$ bent so as to lie farther away from the belt 40 and some of the hooks 41′ extending a less distance from the belt than hook 41. Thus all the trip arms will be actuated by hook 41 while only the trip arm 13′ of the first unit to be traversed by the yarn will be actuated by the hook 41′. This first unit will, therefore, have its blades raised twice for each time the blades of the other units are raised once. By suitably varying the number of hooks the relative distances from the belt 40 to which they extend, the degree of bending of the several trip arms and the speed at which the belt 40 is driven, almost any desired actual and relative cleaning of the several units may be provided.

Figs. 12 and 13 also show an improved means for collecting in one mass the impurities which have been removed from the yarn by the several cleaning units. This means comprises a gathering spindle 42 revolubly supported a little forward of and below the line of cleaning units and a packing pan 43 supported from the bar 1 and pressed upwardly against the gathering spindle by a spring 44. During the cleaning operation the spindle 42 is continuously rotated by means of the pulley 45 and belt 46. As the impurities are collected in the V slots of the cleaning units and gradually forced out of said slots by the periodical raising of the blades, fibers necessarily pulled from the yarn with the impurities will attach themselves to said gathering spindle and be wound thereupon thus assisting to free the slots. As the impurities are thus wound upon the gathering spindle they will be continuously packed down or felted upon the same by the action of the packing pan 43 and spring 44 the pan being forced farther and farther away from the spindle as the tube of felted impurities becomes larger and larger in diameter. At intervals the entire tube thus formed of impurities may be drawn off the spindle which is preferably tapered for this purpose.

As previously described, the blades, *e. g.*, 6, 6′ (Figs. 1 to 4, 12 and 13) are always lightly pressed toward one another by the action of spring 8 and hence automatically adjust themselves to yarns of different diameters or to an individual yarn of irregular diameter. Since with the larger diametered yarns, however, the compression of spring 8 may become so great as to cause the blades to exert an undesirable pressure upon the yarn, I have provided distance pieces 47 (Fig. 19) each comprising a flat metal strip one end of which is bent in the plane of the strip so as to constitute a crook or loop 48; the distance between the legs of the crook being just slightly greater than the diameter of the shank of spindle 7. This distance piece may be grasped by its longer leg and the crook 48 slipped down between the blades 6, 6′ and over said shank thus separating the blades by a definite minimum distance. To vary this minimum distance I may either employ distance pieces of different thicknesses or I may insert between the blades a greater or less number of thin distance pieces.

Figs. 15 to 18 illustrate a modification of my invention very similar to that of Figs. 12 to 14. The blade raising means, however, is of novel character and it is so related to the gathering spindle that both it and said gathering spindle may be instantly and automatically stopped whenever the yarn being cleaned happens to break.

Referring to the figures the wire from which the trip arm $13^2$ is bent up is light and springy, being preferably a piece of piano wire. The trip arm itself has an upwardly and rearwardly inclined loop 49 with a long terminal limb 50 which rests against or near to the outer periphery of the tripping shaft 20′. The shorter arm of the loop is bent to pass loosely and transversely through the supporting bar $1^3$ and is then again bent to provide a forwardly extending square loop having a base portion 50′ under but spaced from the arms 11 and a terminal limb 51 which extends upwardly and rearwardly so that its end rests normally against the under side of the bed 5. When the tripping shaft is rotated (in the direction of the arrows Fig. 16) each pin 23 engages the trip arm $13^2$ and forces the end of limb 51 tightly against the under side of bed 5 springing both said limb and the trip arm. As the pin 23 slips past the trip arm these spring portions suddenly react and the base portion 50′ is thrown up against the arms 11 resulting in an effective but exceedingly quick raising of the blade edges from the bed.

The supporting bar $1^3$, which carries the cleaning units, is itself carried by a bracket 52 with which it has frictional sliding dovetailed engagement (shown dotted at 53) this bracket itself being arranged for attachment to the winding or other machine with which my yarn cleaner is to be associated. The cleaning mechanism proper may, therefore, for the purposes of inspection and repair be instantly and entirely disengaged from the bracket which carries the driving mechanism now to be described. Arranged parallel to bar $1^3$ and passing slidably through the head of this bracket is a shift spindle 54 the inner end of which is provided with a washer having an annular recess 55 while the outer end is slotted to slidably receive a shifting link comprising a wire bent at one end to provide a figure of wedge shaped contour 56, and at the other end to provide an arm 57.

On each side of the shift spindle is a clutch spindle 58 and upon each clutch spindle is a linearly slidable clutch pulley 59. The inner side of each pulley has a boss 60 provided with an annular recess 61 similar to that of the shift spindle while each outer side has a projecting clutch pin 65.

A closed loop or yoke 62 has its sides and ends embraced by the walls of the recess 55 and of the recesses 61 respectively.

The gathering spindle 42 and the tripping shaft 20′ are rotatably supported by hanger brackets 63 and 64 fixed to the lower side of bar $1^3$. The bracket supporting the smaller end of the gathering spindle has its bearing opening somewhat larger than said end thus permitting the bracket to be swung up (shown dotted in Fig. 15) when it is desired to remove the tube of felted impurities, as previously explained. The end of the gathering spindle and of the tripping shaft adjacent to the clutch pulleys 59 is provided with a transverse shaft clutch pin 65′.

In the operation of the form of my invention shown in Figs. 15 to 18 the arm 57 of the shifting link is connected to some suitable operative member (not shown) of the winding or other machine with which the yarn cleaner is associated, said operative member being so controlled by the yarn being cleaned that so long as the yarn is intact in its position in the cleaner the shifting link will be in its extreme innermost position (Figs. 15, 16 and 17). In this position the spiral spring 66 pushes the shift spindle and hence, through yoke 62, the two clutch pulleys 59 toward the gathering spindle and the tripping shaft so that the clutch pins 65 of the pulleys engage with the two shaft clutch pins 65′. Should the yarn break, the shifting link instantly takes the position shown in Fig. 18 thus moving the clutch pulleys against the resistance of spring 66 away from the gathering spindle and the tripping shaft and disengaging the clutch pins 65 from the shaft clutch pins 65′.

It is important to thus instantly arrest the rotation of the tipping shaft and of the gathering spindle when the yarn breaks since otherwise the yarn behind the break is very likely to become entangled with and drawn along by said rotating parts and incidentally entangled with the cleaning units themselves so that time is lost clearing this tangle away before the cleaner can again be put into action.

The clutch pulleys 59 are presumed to be continuously driven by a belt (not shown) brought to them from any convenient source of power.

Many changes of detail may be made without departing from the spirit of my invention which I have embodied in the following claims.

I claim:

1. In a cleaning unit for use with a running thread of yarn, gripping means comprising members provided with curved edges lying in the same plane and arranged to form a V shaped slot between them, said slot being wholly at one side of the line of travel of the yarn.

2. In a cleaning unit for use with a running thread of yarn, gripping means comprising members provided with curved edges lying in the same plane and arranged to form a V shaped slot between them, said slot being wholly at one side of the line of travel of the yarn with a portion of said slot immediately adjacent thereto.

3. In a cleaning unit for use with a running thread of yarn, gripping means comprising members provided with curved opposed edges lying in the same plane and arranged to form a V shaped slot between them, said slot being wholly at one side of the line of travel of the yarn with a portion of said slot immediately adjacent thereto.

4. In a cleaning unit for use with a running thread of yarn, gripping means comprising members provided with opposed edges lying in the same plane and arranged to form a V shaped slot which is wholly at one side of the line of travel of the yarn, a portion of said slot being immediately adjacent to said line of travel and the remainder diverging therefrom.

5. In a cleaning unit for use with a running thread of yarn, the combination of a bed, a blade provided with an edge opposed to, resting upon and arranged so as to form a V shaped slot with said bed, and means for positioning the yarn upon said bed parallel with and adjacent to the plane of said slot.

6. In a cleaning unit for use with a running thread of yarn, the combination of a bed provided with a surface which diverges from the line of travel of said yarn, a blade provided with an edge opposed to and arranged so as to form a V shaped slot with said bed, and means for positioning said yarn upon said bed adjacent to said slot.

7. In a cleaning unit for use with a running thread of yarn, the combination of a bed provided with a surface which diverges from the line of travel of said yarn, a blade provided with an edge resiliently opposed to and arranged so as to form a V shaped slot with said bed, and means for positioning the yarn upon said bed adjacent to said slot.

8. In a cleaning unit for use with a running thread of yarn, the combination of a bed provided with a surface which diverges from the line of travel of said yarn, a blade provided with an edge resiliently opposed to and arranged so as to form a V shaped slot with said bed, means for momentarily raising said edge from said bed, and means for positioning the yarn upon said bed adjacent to said slot.

9. In a cleaning unit for use with a running thread of yarn, the combination of a bed provided with a surface which diverges from the line of travel of said yarn, a blade having an edge opposed to and arranged so so as to form a V shaped slot with said bed, yielding means for pressing said edge toward said bed, and means for momentarily diminishing the effect of said yielding means.

10. In a cleaning unit for use with a running thread of yarn, the combination of a bed provided with a surface which diverges from the line of travel of said yarn, a blade provided with an edge opposed to and arranged so as to form a V shaped slot with said bed, means for positioning said yarn upon said bed and resilient means for positioning the yarn adjacent to said slot.

11. In a cleaning unit for use with a running thread of yarn, the combination of a bed provided with a surface which diverges from the line of travel of said yarn, a pair of blades each provided with an edge opposed to and arranged so as to form a V shaped slot with said bed, said blades being resiliently pressed toward one another, and means for positioning the yarn between said blades adjacent to said slots.

12. In a cleaning unit for use with a running thread of yarn, the combination of a bed provided with a surface which diverges from the line of travel of said yarn, and a pair of blades each provided with an edge opposed to and arranged so as to form a V shaped slot with said bed, said blades being resiliently pressed toward one another.

13. In a cleaning unit for use with a running thread of yarn, the combination of a bed provided with a surface which diverges from the line of travel of said yarn, a pair of blades each provided with an edge opposed to and arranged so as to form a V shaped slot with said bed, said blades being resiliently pressed toward one another, means for positioning the yarn between said blades adjacent to said slots, and means for momentarily raising said edges from said bed.

14. In a cleaning unit for use with a running thread of yarn, the combination of a bed provided with a surface which diverges from the line of travel of said yarn, a pair of blades each provided with an edge opposed to and arranged so as to form a V shaped slot with said bed, means for positioning the yarn between said blades adjacent to said slots, and means for introducing particles of impurities and the like adhering to the yarn into one of said slots.

15. In a cleaning unit for use with a running thread of yarn, the combination of a bed provided with a surface which diverges from the line of travel of said yarn, and a pair of blades each provided with an edge opposed to and arranged so as to form a V shaped slot with said bed, one of said blades being provided with a corner bent toward the other blade to constitute a deflector.

16. In a cleaning unit for use with a running thread of yarn, the combination of a bed provided with a surface which diverges from the line of travel of said yarn, and a pair of blades each provided with an edge opposed to and arranged so as to form a V shaped slot with said bed one of said blades being shorter than the other.

17. In a yarn cleaner the combination of a plurality of cleaning units for detaching impurities from a running thread of yarn arranged in line, a revoluble gathering spindle adjacent to said line of cleaning units, and adapted to receive impurities from the units thereof and means for compacting said impurities upon said spindle.

18. In a yarn cleaner the combination of a plurality of cleaning units for detaching impurities from a running thread of yarn arranged in line, a revoluble gathering spindle adjacent to said line of cleaning units and adapted to receive the impurities from the units thereof and a spring pressed packing pan for compacting said impurities upon said spindle.

19. In a yarn cleaner the combination of a plurality of cleaning units for detaching impurities from a running thread of yarn arranged in line, a revoluble gathering spindle adjacent to said line of cleaning units and adapted to receive the impurities from the units thereof and a packing pan for compacting said impurities upon said spindle.

20. In a cleaning unit for use with a running thread of yarn, the combination of a bed provided with a yarn supporting surface which diverges from the line of travel of said yarn, a pair of blades between which the yarn is arranged to run each provided with an edge opposed to and arranged so as to form a V shaped slot with said bed surface, means for pressing said blades toward one another, and means for adjusting the space between said blades to conform to any variation of yarn diameter.

21. In a yarn cleaner, the combination of an attaching bracket provided with driving means, a support provided with a cleaning unit, said support being detachably joined to said bracket, a tripping shaft coöperating with said cleaning unit, and a gathering spindle, and means for operatively connecting or disconnecting said driving means to or from said tripping shaft and said gathering spindle.

22. In a yarn cleaner, the combination of an attaching bracket provided with driving means, a support provided with a cleaning unit, a tripping shaft and a gathering spindle, said support being detachably joined to said bracket, and means for operatively connecting or disconnecting said driving means to or from said tripping shaft and said gathering spindle.

23. In apparatus for removing impurities from a running thread of yarn, the combination of means for maintaining the yarn in a straight line of travel and gripping means comprising members provided with opposed edges arranged so as to form a V-shaped slot between them which is wholly at one side of the line of travel of the yarn, the larger and smaller ends of the slot being respectively immediately adjacent to and remote from said line of travel.

24. In apparatus for removing impurities from a running thread of yarn, in combination, means adjacent the thread to pinch and hold the impurities and means to actuate said first means at intervals for releasing said impurities.

25. In apparatus for removing impurities from a running thread of yarn, in combination, means adjacent the thread to grip the impurities projecting therefrom and retain the same as the thread runs on, and means to actuate said gripping means at intervals for releasing said impurities and effecting their separate disposal.

26. In apparatus for removing impurities from a running thread of yarn, in combination, means adjacent the thread to grip the impurities projecting therefrom and retain the same as the thread runs on, and means to actuate said gripping means at intervals for releasing said impurities and effecting their separate disposal by the running thread.

27. In apparatus for removing impurities from a running thread of yarn, in combination, means arranged to seize and collect impurities from the running thread and tending to divert such impurities away from the line of travel of the thread, and means to actuate said first means at intervals to release the collected impurities and to cause the latter to be brushed by the thread and thus ejected from said first means.

28. In apparatus for removing impurities from a running thread of yarn, in combination, gripping means including two members constituting a claw having a slot narrower than the thickness of the thread to be cleaned and operative to seize and collect impurities from said thread as the latter runs, and means to actuate said first means at intervals to open said slot for releasing the impurities and to cause the latter to be ejected away from said first means and from the thread.

29. In apparatus for removing impurities from a running thread of yarn, in combination, gripping means including two members constituting a claw having a slot narrower than the thickness of the thread to be cleaned and operative to seize and collect impurities from said thread as the latter runs, and means to actuate one of said members at intervals to open said slot for releasing the collected impurities and to cause the latter to be brushed by the running thread and thus ejected from said first means.

30. In apparatus for removing impurities from a straight running thread of yarn, in combination, gripping means arranged at the side of and in a plane substantially parallel to the plane of travel of the yarn thread, said means including a claw to receive and seize surface impurities on the yarn thread as it runs and to guide such seized impurities away from the thread, and means to actuate said first means at intervals to release such impurities.

31. In apparatus for removing impurities from a straight running thread of yarn, in combination, gripping means arranged at the side of and in a plane substantially parallel to the plane of travel of the yarn thread, said means including a claw to receive and seize surface impurities on the yarn thread as it runs and to guide such seized impurities away from the thread, and means to actuate said first means at intervals to release such impurities and to cause the same to be brushed by the running thread and thus ejected from said first means.

32. In apparatus for removing impurities from a straight running thread of yarn, means arranged to grip the impurities and retain the same as the thread runs on and tending to divert the impurities while gripped away from the line of travel of the thread, and means to actuate said first means at intervals to release the gripped impurities and to carry them in contact with the running thread for ejection thereby from said first means.

33. In apparatus for removing impurities from a running thread of yarn, in combination, means to grip and retain the impurities, said means including two members positioned to afford a slot therebetween, one of said members being movable relatively to the other to alter the dimension of said slot, and means to move one of said members momentarily at recurring intervals.

34. In apparatus for removing impurities from a running thread of yarn, in combination, means to grip and retain impurities, said means including two members positioned to afford a V-shaped slot therebetween adjacent to the line of travel of the yarn, one of said members being movable relatively to the other to release the impurities, and tripping means to move one of said members intermittently.

35. In apparatus for removing impurities from a running thread of yarn, in combination, a relatively fixed bed over which the yarn runs, said bed being curved away from the line of travel of the yarn, and a gripping element disposed in a plane at substantially right angles to said bed and having a curved edge contacting with said bed at a point removed from the line of travel of said yarn.

36. In apparatus for removing impurities from a straight running thread of yarn, in combination, a relatively fixed bed over which the yarn runs, said bed being curved away from the line of travel of the yarn, a gripping element disposed in a plane at substantially right angles to said bed and having a curved edge contacting with said bed at a point removed from the line of travel of the yarn, and means to move said element at intervals out of contact with said bed and toward the plane of travel of the yarn.

In testimony whereof I affix my signature, in the presence of two witnesses.

ROBERT G. JENNINGS.

Witnesses:
CHARLES RENO,
CECELIA HOFTRUP.

Corrections in Letters Patent Reissue No. 14,818.

It is hereby certified that in Letters Patent Reissue No. 14,818, granted March 16, 1920, upon the application of Robert G. Jennings, of Elmira, New York, for an improvement in "Yarn-Cleaners," errors appear in the printed specification requiring correction as follows: Page 2, line 95, for the word "for" read *four;* page 3, line 12, for the word "plat" read *flat;* page 6, line 52, for the word "tipping" read *tripping;* and that the said Letters Patent should be read with these corrections therein that the same may conform to the record of the case in the Patent Office.

Signed and sealed this 20th day of April, A. D., 1920.

[SEAL.]

M. H. COULSTON,
*Acting Commissioner of Patents.*

Cl. 28—20.